May 2, 1961    C. A. HASKELL ET AL    2,982,133
SUMMATION APPARATUS
Filed Aug. 30, 1955    4 Sheets-Sheet 1
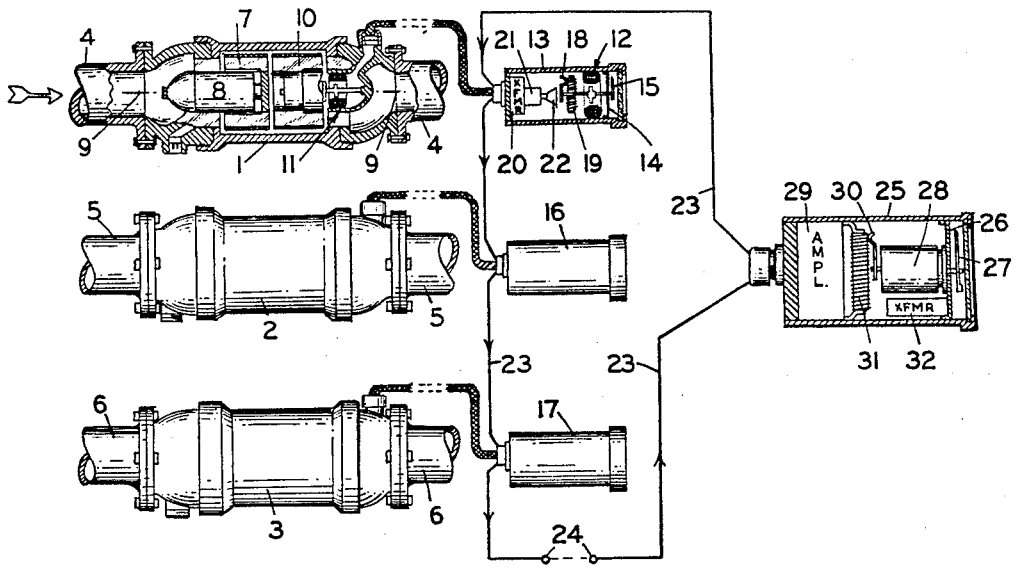
Fig.1
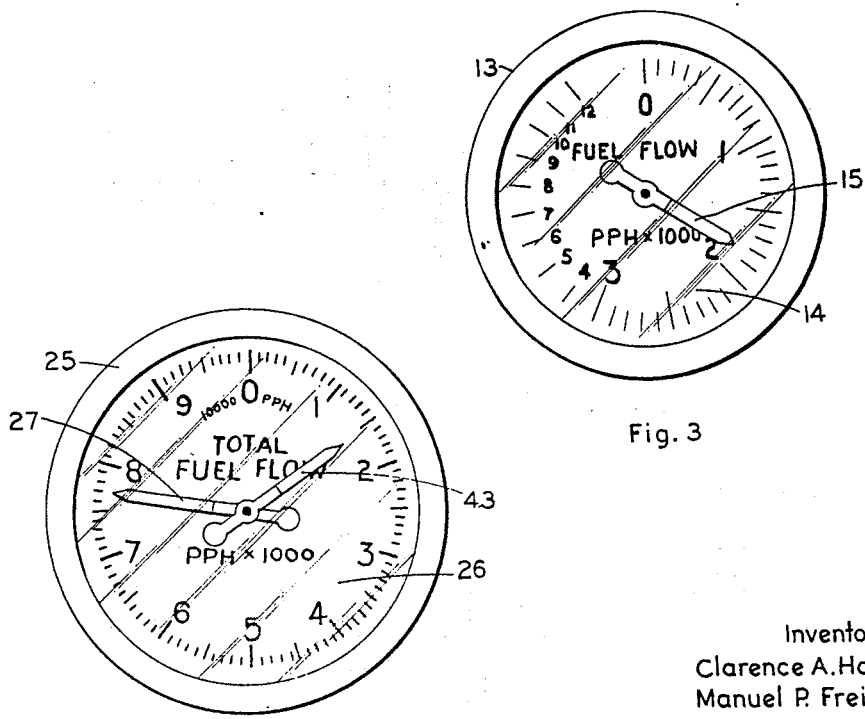
Fig. 3
Fig. 4
Inventors:
Clarence A. Haskell
Manuel P. Freitas
by, Richard E. Hosley
Their Attorney Inventors:
Clarence A. Haskell
Manuel P. Freitas
by, *Richard C. Hosley*
Their Attorney Inventors:
Clarence A. Haskell
Manuel P. Freitas
by, *Richard E. Hosley*
Their Attorney Inventors:
Clarence A. Haskell
Manuel P. Freitas
by, Richard E. Horley
Their Attorney United States Patent Office 2,982,133
Patented May 2, 1961

2,982,133
SUMMATION APPARATUS

Clarence A. Haskell, Marblehead, and Manuel P. Freitas, Revere, Mass., assignors to General Electric Company, a corporation of New York Filed Aug. 30, 1955, Ser. No. 531,565

6 Claims. (Cl. 73—195)

The present invention relates to summation measuring apparatus and, more particularly, to flowmeter systems which provide indications of the rate of fluid flow in each of several flow lines as well as the total rate of fluid flow for these lines.

In the measurement of fuel flow aboard multi-engine aircraft, it may be important to display not only the characteristics of fuel flow to each of the engines but also the totals of these characteristics as well. A flow detector is commonly included in each of the engine fuel lines to afford the individual indications, and totalization or summation could be accomplished directly through use of an additional flow detector of much greater capacity, provided the extra weight, bulk, and expense could be tolerated, and provided a common flow line from all fuel cells to all engines could be provided as the locus of the additional flow detector. Alternatively, the output signals from the flowmeters associated with the individual engines could be added directly to yield a summation signal, provided the output signals all vary linearly with the flow characteristic under measurement. However, required non-linear flowmeter responses, demands for highest accuracies and minimized weight, bulk and cost, and the absence of common flow lines render these obvious approaches unsuitable.

As appears more fully hereinafter, summation of the output signals of a plurality of non-linear detector units is achieved in the practice of this invention without the use of an additional detector unit and, further, non-linear output signals in any number may be readily added and displayed without special adjustment or calibration of the equipment. Summation indications are produced with negligible reflection of torques upon low-torque actuating members while high accuracies and rapid response are attained. The totalizations are accomplished automatically and continuously.

One of the objects of the present invention is to provide improved apparatus for the automatic and continuous summation of a plurality of measurements.

In addition, it is an obect to provide improved flowmeter summation apparatus which measures and continuously indicates the total flow of fluid sensed by a plurality of fluid flow detectors having non-linear measurement characteristics.

By way of a summary account of one aspect of this invention, we employ several fluid flow detectors each measuring the mass rate of fuel flow to an aircraft engine and each operating an electromechanical telemetering assembly which actuates a remote indicator of the mass rate of fuel flow per unit of time. Output characteristics of these indicators are non-linear, that is, the angular deflections of the indicators are of one value for each incremental change in flow rate over one range of flows and are of a different value for the same incremental change in flow rate over a different range of flows. At the indicators, the low-torque and non-linear output indications are converted into synchronized pulsed A.-C. voltages which vary linearly with the flow rates displayed, such that these pulsed A.-C. voltages may be combined in a simple series addition to represent totalized mass rate of fuel flow. Servo motor drive of a summation indicator is derived from the combined pulsed A.-C. voltages which are compared with a follow-up signal responsive to the summation indication.

Although the features of this invention which are believed to be novel are set forth in the appended claims, the details of the invention itself and further obects and advantages thereof may be most readily comprehended through reference to the following description taken in connection with the accompanying drawings, wherein:

Figure 1 provides a simplified pictorial view of a flow-metering system embodying teachings of this invention, certain parts being broken away to expose constructional details;

Figures 3 and 4 are pictorial representations of individual flow and summation flow indicator dials, respectively;

Figure 5:
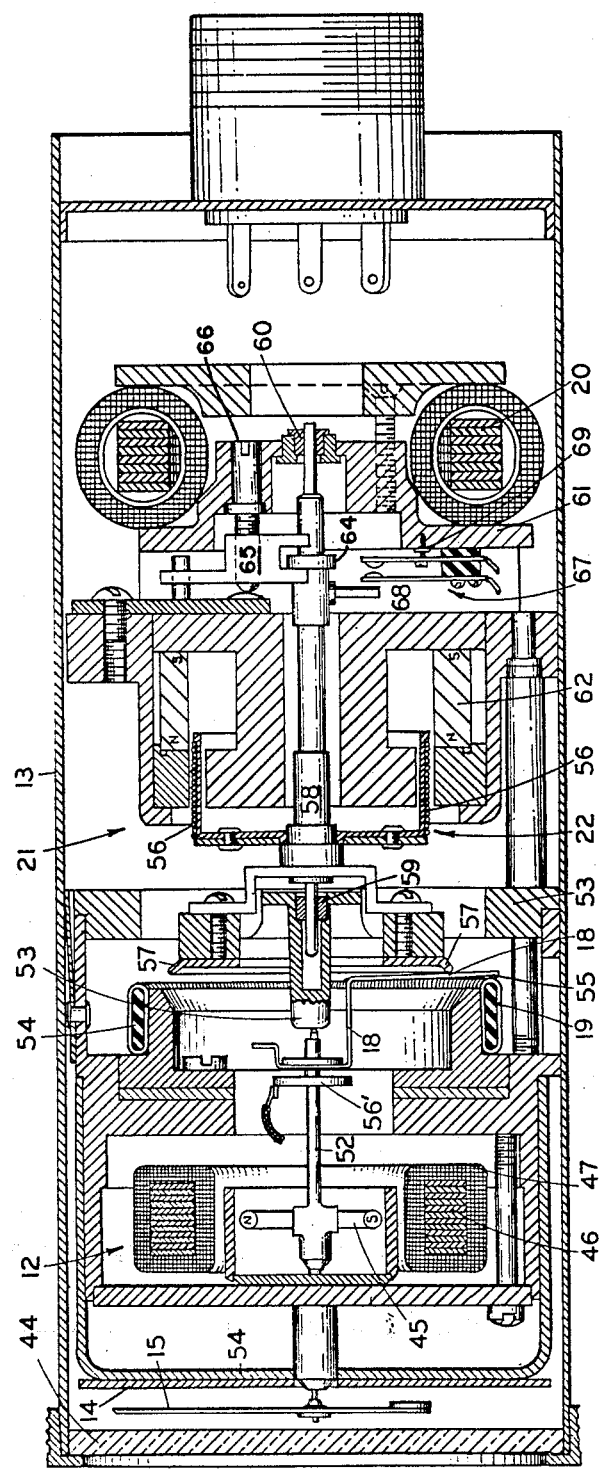
Figure 5 is a longitudinal cross-section of an individual flow indicator unit having summation components.
Figure 6:
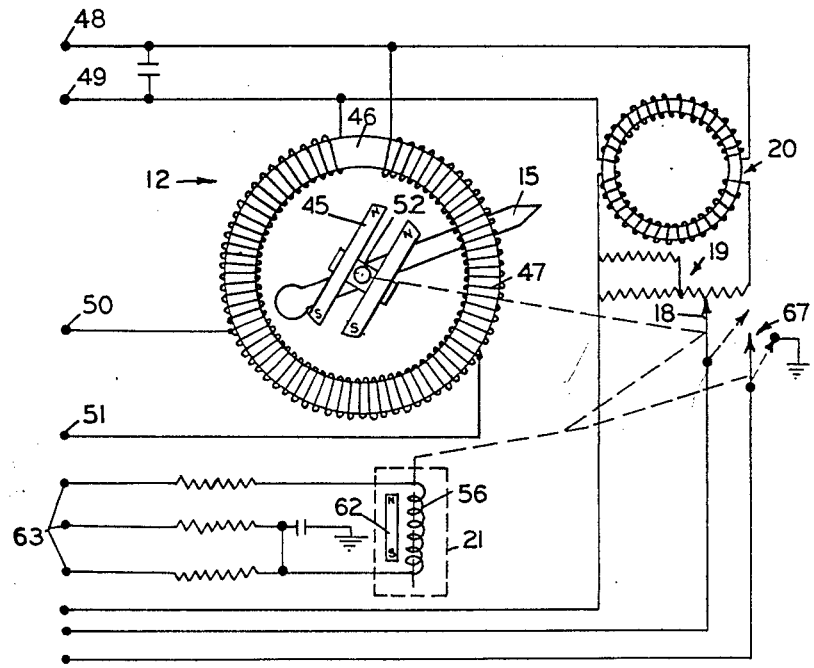
Figure 7:
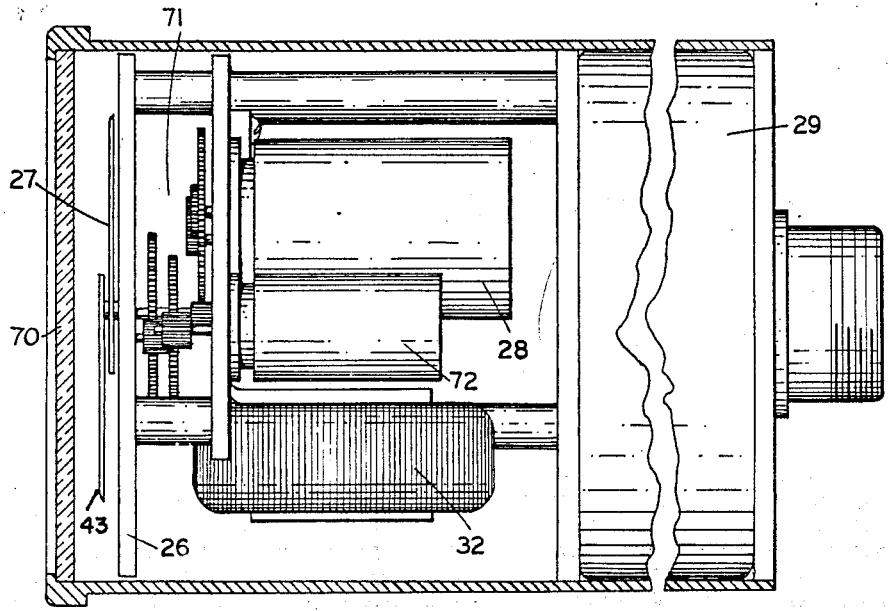

Figure 6 provides a schematic diagram of the electrical wiring for the indicator unit of Figure 5; and Figure 7 is a longitudinal cross-section of a summation indicator unit.

There are illustrated in Figure 1 three independent mass rate flowmeter detectors, 1, 2, and 3, which are coupled serially into fuel lines 4, 5, and 6 supplying the engines of a multi-engine aircraft from various fuel cells. Flowmeters of this axial-flow type, such as flowmeter 1, include an upstream cylindrical impeller 7 which has longitudinal peripheral slots and is rotated at substantially a constant speed by a motor 8 such that the fluid fuel has imparted to it a substantially uniform linear speed of motion in an angular direction about the longitudinal axis 9—9 of the impeller. A cylindrical turbine element 10 is provided in a proximate downstream relationship to the impeller and is likewise constructed to have longitudinal peripheral slots to accommodate flow of fluid through the flow detector. Turbine 10 is angularly restrained however, by a spring assembly not detailed in the drawing, and deflects angularly about the axis 9—9 in response to the mass flow of fuel per unit of time. The spring assembly is one which has one torque vs. deflection characteristic over one range of deflections, say in a low flow range, and a second and more steeply sloped torque vs. deflection characteristic over another range of deflections corresponding to a higher range of flow. An electromagnetic telemetering transmitter 11 senses the turbine deflections and actuates a corresponding telemetering receiver 12 in a remote indicator 13 which displays the mass rate of flow information through a suitably calibrated dial 14 and pointer 15. The other flowmeter detectors, 2 and 3, are of like construction and cooperate with similar remote indicators 16 and 17, respectively.

If desired, further details of suitable flowmeter constructions may be observed in the disclosures of U.S. Patent No. 2,714,310 for "Mass Rate Flowmeter," and additional details of suitable turbine restraining spring assemblies may be found in the disclosures of U.S. Patent No. 2,717,573 for "Dual Pointer Indicator," both assigned to the same assignee as that of the present application. The transmitting and receiving telemetering units referred to may each be of the well-known second-harmonic type in which a permanent magnet rotor cooperates with an annular stator core which is saturated periodically and which carries a polyphase-tapped toroidal stator winding. Alternatively, other telemetering units may be employed, and similarly, other known flow detectors, such as those which have a simple restrained vane, may be utilized in place of the illustrated mass rate flowmeters.

Each of the remote indicators 13, 16, and 17 not only displays the mass rate of flow data measured by its associated flow detector but also includes certain components of the summation apparatus. In particular, it should be observed that the pointer shaft of each indicator, such as indicator 13, angularly actuates a potentiometer wiper arm 18 which is positioned for engagement with a potentiometer resistance element 19. As is explained more fully hereinafter, the potentiometers are compensated for the earlier-noted non-linearity, and are energized through special transformers, such as transformer 20. Potentiometer wiper arm 18 is caused to engage and disengage potentiometer resistance 19 periodically, by a solenoid 21 of which the armature 22 serves to press the spring-biased wiper arm into the desired contacts. The potentiometer outputs are combined in simple series addition by connecting leads 23, and further like indicator units may be coupled with the others when inserted in series between points 24. Summation or totalization of the potentiometer output signals is achieved in an indicator 25 which displays this information through a calibrated dial 26 and cooperating pointer 27 driven by a small servo motor 28. Reversible motor 28 is controlled by a servo amplifier 29 of the discriminator type which yields A.-C. outputs having one phase when the input has one phase and having a reversed phase when the input also possesses a reversed phase. A potentiometer wiper arm 30 is also moved by motor 28 such that it variably taps a follow-up voltage from across the potentiometer resistance 31 which derives its voltage from a suitable transformer 32. This tapped voltage is compared with the sum of voltages from the individual indicators and it is the difference of these voltages which excites servo amplifier 29 to actuate servo motor 28 in one or the other angular direction until the difference voltage is reduced to zero and pointer 27 correctly indicates the sum of fuel flows.

Figure 2:
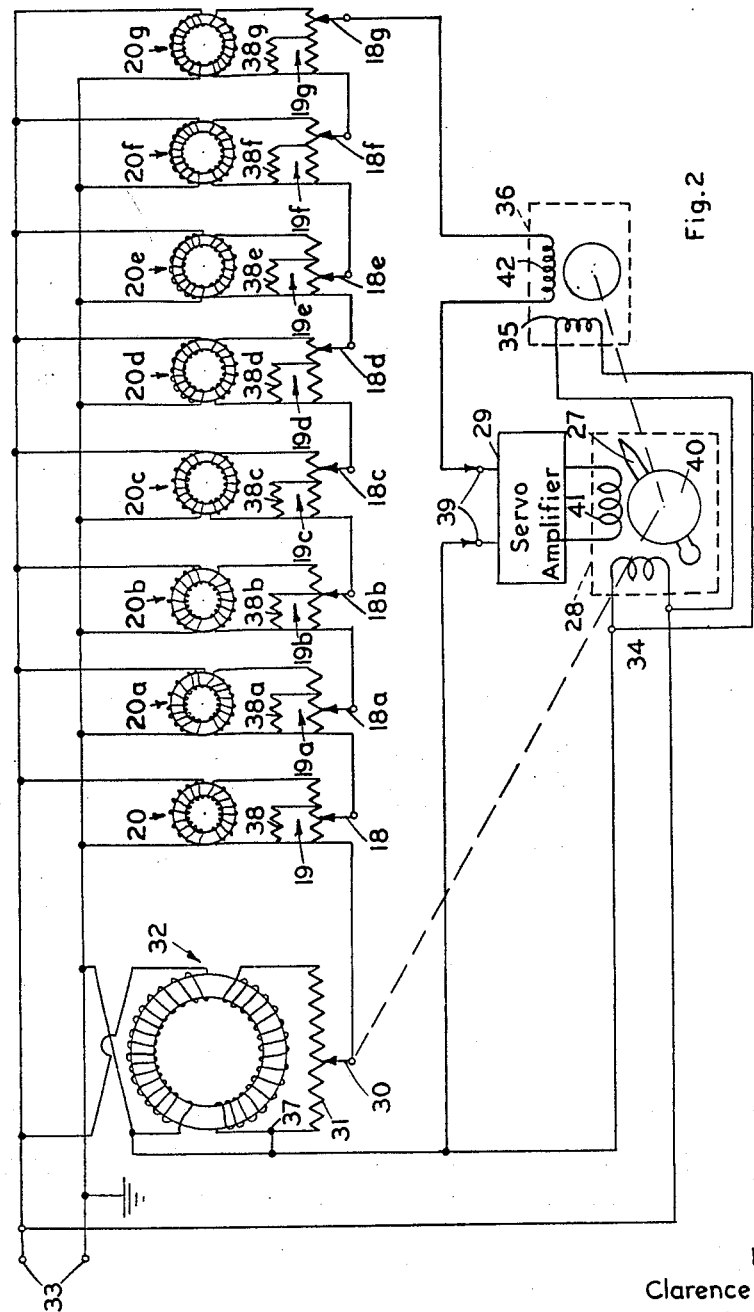
Figure 2 is a schematic diagram of a portion of one system in which the invention may be practiced.

In Figure 2, electrical circuitry of one summation system is shown, those elements corresponding to elements in Figure 1 being identified by the same reference characters. Electrical excitation from an A.-C. source is applied across input terminals 33 to energize the primaries of low-capacitance isolation transformers 32 and 20 through 20g and one phase winding 34 of the two-phase servo motor 28 and, if desired, the excitation winding 35 of a miniature rate-signal generator 36. This excitation may comprise the standard 400-cycle supply for an aircraft, for example. The secondary winding of the summation indicator transformer 32 impresses a fixed voltage across the follow-up potentiometer resistance 31, and voltages tapped from this resistance for follow-up purposes appear across wiper arm 30 and the grounded point 37 of the potentiometer assembly. Secondary windings of the individual flow indicator transformers 20 through 20g likewise impress fixed voltages, identical to one another, across the associated potentiometer resistances 19 through 19g, and voltages related to the individual flow indications are tapped from these potentiometers by wiper arms 18 through 18g. Inasmuch as all of the tapped voltages are added in series, the phases and amplitudes of the various transformer outputs must be accurately controlled and the leakages appearing through the transformers must be minimized. These desired characteristics are preferably achieved with transformers of the illustrated toroidal configuration, each annular core of magnetic material having toroidal primary and secondary windings each wound over a different half of the core and each physically spaced from the core by suitable insulation. Air gaps in the magnetic circuitry are eliminated through use of the annular core construction, and the spacings of the primary and secondary windings minimize the capacitance between them, as does the spacing of the windings from the cores also. The very low capacitances experienced avoid leakage and phase shift and enable either a small or a large number of individual indicators to be coupled into the summation system without significant alteration of its characteristics and without requirement for special adjustments or calibrations.

The potentiometer resistances 19 through 19g are each in part shunted by a fixed resistance, such as resistances 38 through 38g respectively, to compensate for the aforesaid non-linear characteristic of individual indicator and wiper arm movements. Figure 3 illustrates the overall non-linearity of the individual indicators in terms of travel of pointer 15 with reference to the indicia on dial plate 14, there being a first linear expanded scale portion between zero and 3,000 pounds per hour of flow, and a second linear and relatively contracted scale portion for flows between 3,000 and 12,000 pounds per hour. Were the wiper arms 18 through 18g to move across uncompensated potentiometer resistances with the same deflection versus flow characteristics as the pointer 15 to which they are fixed, it would not be possible to obtain a flow totalization signal by mere addition of the tapped potentiometer output signals. Accordingly, shunting resistances 38 through 38g are employed to cause the voltages tapped across the shunted portions of potentiometers 19 through 19g to vary in amplitude for each incremental change in indicated flow rate by the same amounts as the voltages tapped across the unshunted portions of the potentiometer resistances. The simple calculation methods which will yield values of suitable shunting resistances are well understood. In other applications where the individual detectors have further ranges of still different deflection vs. flow slopes, additional shunting resistances will yield the desired uniform voltage vs. flow potentiometer characteristic. Although shunting resistances are perhaps the most simple aids to achievement of the desired voltage vs. flow characteristic, specially wound potentiometer resistances may be utilized also, with wire of different resistances being used over different portions of the potentiometer or with wire of one resistance vs. length characteristic being wound with appropriately varied spacing between turns. Potentiometer resistance 31 which is a part of the summation indicator unit needs no such compensation because angular movements of its wiper arm 30 with the pointer 27 are linearly related to the totalized flow values.

The voltage tapped from across the summation indicator potentiometer resistance 31 are of phase opposite to the phase of signals tapped from across the potentiometers 19 through 19g of the individual indicators. Thus, for any series addition of voltages from the potentiometers 19 through 19g, an equal amplitude and oppositely phased voltage may be tapped from across the serially connected potentiometer resistance 31, such that the voltage appearing at the input terminals 39 of servo amplifier 29 will be substantially zero. This balanced condition is realized when the armature 40 of servo motor 28 correctly positions the potentiometer wiper arm 30, the indicator 27 being positioned simultaneously by motor 28 to display the totalized flow information. Servo amplifier 29 is phase-sensitive, and if the follow-up signal from potentiometer 31 is less than the added signals from potentiometers 19 through 19g, it will excite motor winding 41 in a sense causing rotation of armature 40 in one direction until wiper arm 30 taps the proper follow-up or balancing voltage from resistance 31. Conversely, if the follow-up signal is greater, the motor armature 40 will be rotated in the opposite direction until the servo amplifier input is zero. Anti-hunting stabilization of the servo system may be realized, if desired, through use of a rate generator 36 which operates in a known manner to apply a feedback signal to the input of amplifier 29 from the generator output winding 42.

The linear output characteristics of summation indicator 25 may be appreciated through reference to Figure 4. Preferably, an auxiliary multiple-speed pointer 43 is used in geared relationship with the main pointer 27, such that vernier summation indications are afforded.

In Figures 5 and 6 there are portrayed the detailed mechanical and electrical constructions, respectively, of the indicator 13 for the individual flow detector 1 of Figure 1. The pointer 15 is illustrated in its cooperative relationship with dial 14 behind a window glass 44 of the instrument 13 in Figure 5, this pointer being actuated angularly by the magnetized rotor 45 of a second-harmonic telemetering receiver also including the usual annular core 46 and polyphase-tapped toroidal winding 47. Alternating current excitation is applied to this winding by way of terminals 48 and 49 shown in Figure 6, and polyphase coupling with a like unit 11 in detector 1 serving as a telemetering transmitter is achieved through terminals 49, 50, and 51. Bearing supports for the shaft 52 for rotor 45 and pointer 15 are provided on the bracket members 53 and 54. Potentiometer wiper arm 18 is also mounted upon the rotor shaft 52 and is disposed for periodic contact with the compensated toroidal resistance element 19 wound upon an insulating annular core 54. Arm 13 is flexible in a direction parallel with the axis of shaft 52, although rigid in angular directions about that axis, and is biased such that its end 55 is normally held out of engagement with resistance wire 19. The necessary electrical connection with wiper arm 18 is made through a low-torque spiral 56'.

As was noted earlier herein, a solenoid 21 having a movable armature 22 is effective to cause periodic engagement and disengagement of the potentiometer wiper arm 18 and resistance 19. In the illustrated construction, the movable armature structure includes a lightweight moving coil 56 which is fixed with and drives a cup-shaped armature member 57, the latter serving to press wiper arm 18 into electrical contact with resistance winding 19 irrespective of the angular positions assumed by the wiper arm. The coil 56 and cup-shaped member 57 are permitted to slide axially with their support shaft 58 in sleeve bearings 59 and 60 positioned on the instrument frame brackets 53 and 61. A fixed and permanently magnetized solenoid core 62 sets up a uniform magnetic field in which the annular solenoid coil 56 moves in the aforesaid manner upon electrical A.-C. excitation through terminals 63 shown in Figure 6. Shoulder 64 on the solenoid armature shaft 58 cooperates with a double stop member 65 which is adjustable axially with reference to shaft 58 upon movement of the bracket-mounted set screw 66, whereby the influences of the cup-shaped armature member 57 upon wiper arm 18 may be finely adjusted. With this stop provision, excessive axial travel of the solenoid armature is precluded, and the periodic potentiometer contacting can be controlled such that for each cycle of excitation of coil 56 the potentiometer resistance will be contacted by the wiper arm for a definite time.

It has proven desirable that the input of the summation servo amplifier 29 be reduced to zero by grounding during the periodic intervals when the potentiometers of the various individual flow indicators are not contacted by their wiper arms. Accordingly, such indicators are provided with an adjustable normally-open grounding switch 67 closed by an actuating arm 68 projecting from its solenoid armature shaft 58. By initial adjustment of one leaf of switch 67, as through manipulation of adjusting screw 69, the portion of each operating cycle of the solenoids during which the amplifier input is grounded may be closely regulated and all indicators may thus be synchronized in their control of the amplifier.

The periodic contacting in the potentiometers of the individual flow indicators enables use of low-torque telemetering receivers, such as the illustrated second-harmonic receiver units 12. Ordinarily, the frictional engagement between potentiometer resistance 19 and its wiper arm 18 would hinder movement of the pointer shaft 52 because of the low torques generated by the magnetized telemeter rotor 45. However, solenoid 21 causes such frictional engagement only during short periodic intervals, and the rotor shaft 52 remains unrestrained during the alternate intervals. The frequency of such intermittent potentiometer contacting is high in relation to the expected speeds of movement of rotor shaft 52 and pointer 15, such that the pointer 15 may deflect smoothly and quickly. It has been found that a solenoid excitation of 4 cycles per second is entirely satisfactory, for example. This frequency need not be accurately controlled, and in fact may vary somewhat without disturbing system accuracy, provided all solenoids of the system are excited in synchronism from the same alternating current source. For example, a simple electrically-actuated bi-metal switch interrupting a D.-C. voltage will provide a suitable excitation signal for the solenoids. While the solenoid contacting frequency is high in relation to expected pointer speeds, it is also low in relation to the frequency of A.-C. excitation supplied to the individual indicator potentiometers, servo amplifier, servo motor, etc. This is desirable in order that the servo amplifier, motor, and follow-up potentiometer may respond satisfactorily to the signals appearing at the input of the servo amplifier. In the specific embodiment described here, the A.-C. excitation is 400 cycles per second and the solenoid is actuated by a signal of 4 cycles per second, such that a group of about 50 cycles of the A.-C. output from the individual indicator potentiometers are applied to the amplifier input during each of the alternate intervals when the solenoids cause the potentiometer wiper arms to engage the resistance windings. The servo system time response characteristics will thus largely govern the frequency of solenoid excitation.

One construction of a suitable summation indicator unit is detailed in Figure 7, the servo amplifier 29 being encased therewith and the main pointer 27 and vernier pointer 43 being visible through a front window glass 70. Gearing 71 accomplishes the desired pointer and potentiometer drives from servo motor 28. The summation potentiometer unit may conveniently comprise a miniature unit 72 of the compact helically-wound type. High-torque drive of follow-up potentiometer 72 by servo motor 28 obviates the need for intermittent contacting such as is provided for the potentiometers of the individual indicators. Nor is special compensation required for the resistance element of potentiometer 72, inasmuch as the characteristics of the summation indicator are linear.

Although the only illustrated provision for summation indications comprises the dual pointer and dial arrangement, the summation indications may also be characterized by signal generators, such as potentiometers or electrical pick-offs, driven by the servo motor. The electrical outputs of such signal generators are in proportion to the total flow rate and may be used for control of a flow rate integration or cruise control system.

The specific embodiments of the invention herein disclosed are, of course, of a descriptive rather than a limiting nature, and various changes, combinations, substitutions, or modifications may be employed in accordance with these teachings without departing either in spirit or scope from this invention in its broader aspects.

What we claim as new and desire to secure by Letters Patent of the United States is:

1. In summation apparatus for totalizing a plurality of condition values being measured by a plurality of detectors respectively positioning a plurality of movable members having low torque outputs with the positions of the movable members characterizing but being non-linearly related to the values of the conditions being measured by the detectors: a summation indicator; drive means for actuating the indicator; follow-up means actuated by said drive means for providing a first voltage equal and opposite to a second voltage varying linearly by proportional amounts with the summation of the condition values being measured by the detectors; means connected to said drive means and follow-up means to actuate said drive means in response to a difference between said first and second voltages; and means to convert the non-linear movements of said movable members to said second voltage including a plurality of compensated potentiometers each having a relatively slidable wiper arm and resistance unit and being constructed for relative movement between its wiper arm and resistance unit to effect alternate engagement and disengagement of the same, means for connecting each potentiometer with a respective one of said movable members to effect relative sliding between the wiper arm and resistance unit of the potentiometer in response to movement of said respective one of said movable members, means connecting said potentiometers in additive relationship and to the follow-up means and to said means to actuate said drive means to provide for operation of the drive means in response to relative sliding movement between a potentiometer wiper arm and resistance unit, and means connected to the potentiometers for effecting relative movement between the wiper arm and resistance units thereof to engage and disengage the same in synchronism and at predetermined intervals; and means to connect said drive means, follow-up means and potentiometers to a source of electrical power.

2. In summation apparatus for totalizing a plurality of changing condition values being measured by a plurality of detectors each positioning a movable output member in response to a change in the value of the condition being measured by the respective detector with the positions of the output members characterizing and being non-linearly related to the values of the conditions being measured by the detectors and with each output member being drivingly connected to a low torque telemetering means; a summation indicator; a reversible electric motor drivingly connected to the indicator; follow-up means actuated by said motor for providing a follow-up A.-C. voltage which is of equal amplitude and opposite phase relative to a second A.-C. voltage varying linearly in amplitude and by the same incremental amounts for the same incremental change in the summation of the values of the conditions being measured by the detectors; means connected to said motor and follow-up means for actuating said motor in response to a difference between said first and second voltages; and means to convert the non-linear movements of the output members to said second voltage including a plurality of potentiometers each having a relatively slidable wiper arm and resistance unit and being constructed to permit relative movement between its wiper arm and resistance unit to effect engagement and disengagement of the same, means drivingly connecting each potentiometer with a respective one of said low torque telemetering means to effect relative sliding movement between the wiper arm and resistance unit of the potentiometer in response to movement of a respective one of said output members, means for connecting the potentiometers to A.-C. excitation of the same amplitude and phase to provide for potentiometer outputs varying in amplitude with the relative positions of the wiper arms and resistance units, the resistance units having resistance distributions such that said potentiometer output voltages vary in amplitude linearly and by the same incremental amounts for the same incremental changes in the values of the conditions under measurement, means connecting said potentiometers in additive relationship and to the follow-up means and to said means to actuate said motor to provide for operation of the motor in response to relative sliding movement between a potentiometer wiper arm and resistance unit, and means connected to the potentiometers for effecting relative movement between the wiper arms and resistance units to engage and disengage the same in synchronism and for intervals greater than the period of said A.-C. excitation.

3. In summation apparatus for totalizing a plurality of changeable condition values being measured respectively by a plurality of detectors respectively positioning a plurality of low torque output movable members with the positions of the movable members characterizing and being non-linearly related to the values of the conditions being measured by the detectors; a plurality of potentiometers each having a relatively slidable wiper arm and resistance unit and each being constructed for relative movement between the wiper arm and resistance unit thereof to permit alternate engagement and disengagement of the same, means for connecting each of said movable members with a different one of the potentiometer wiper arms to effect sliding movement of the wiper arm in response to a change in position of the output member, a plurality of solenoids respectively connected to the potentiometers for periodically engaging and disengaging the wiper arm and resistance unit of the potentiometers, a plurality of low capacitance transformers having primary windings adapted to be coupled with the same source of A.-C. excitation and having secondary windings respectively connected to the potentiometers for energizing the same with A.-C. voltages of the same amplitude and phase, the transformers electrically isolating the potentiometers from one another, said resistance unit having resistance distributions such that the output voltages from the potentiometers will vary in amplitude linearly and by the same incremental amounts for the same incremental changes in values of the conditions under measurement by the detectors, means for connecting said solenoids to a source of periodically varying voltage to effect synchronous engagement and disengagement of the wiper arms and resistance units for intervals greater than the period of the A.-C. excitation of the transformers, a reversible electric motor, a summation indicator actuated by said motor, a follow-up potentiometer drivingly connected to the motor to produce output voltages characterizing the summation indications of said indicator, transformer means adapted to be coupled to the same source of A.-C. excitation as said low capacitance transformers and connected to the follow-up potentiometer to provide electrical excitation of the same such that said follow-up output voltages will be of phase opposite to that of the output voltages of the potentiometers, means connecting the potentiometers in additive relation, and means connected to said motor, follow-up potentiometer and plurality of potentiometers for actuating said motor in response to differences between said follow-up output voltage and the sum of the potentiometer output voltages.

4. In summation apparatus of the type described for use with a plurality of detectors for measuring a predetermined range of condition values with each detector having a movable output member positioned in response to a change in the value of the condition being measured by the respective detector and with the positions of the output members being non-linearly related to the values being measured by the detectors and with a plurality of condition value indicators being respectively associated with the detectors and respectively coupled to the detector output members by a plurality of low torque telemetering means; each indicator including a potentiometer having a resistance unit and a relatively slidable wiper arm drivingly connected to the low torque telemetering means of the respective indicator to provide for movement of the wiper arm relative to the resistance unit in response to a change in value of the condition being measured by the respective detector, means for connecting the potentiometers to a source of A.-C. excitation of the same amplitude and phase so as to provide potentiometer A.-C. output voltages varying in amplitudes with the relative positions of the wiper arms and resistance units, the resistance units having resistance distributions such that said potentiometer output voltages will vary in amplitude linearly and by the same incremental amounts for the same incremental changes in values of conditions under measurement, the potentiometer being constructed to provide for alternate engagement and disengagement of the wiper arms and resistance units thereof, means connected to the potentiometers to provide intermittent and synchronous engagement and disengagement of the wiper arms and resistance units at a frequency less than the frequency of the A.-C. excitation of the potentiometers, means connecting the potentiometers to provide that the output voltages thereof will be in additive relation, a reversible electric motor, a summation indicator drivingly connected to the motor, follow-up means drivingly connected to the motor for providing follow-up A.-C. voltage of phase opposite to that of the A.-C. excitation of the potentiometers and of amplitude equal to the sum of the potentiometer output voltages, and means connected to the follow-up means, potentiometers, and motor for actuating the motor in response to differences between said follow-up voltage and the sum of the potentiometer output voltages.

5. In a flowmeter summation apparatus for use with a plurality of flow detectors each measuring a condition of flow in a different fluid line and each angularly positioning an output member to characterize the sensed flow conditions with the angular positions of the output shafts varying by one angular amount for each incremental change in flow rate over one flow rate range and by another angular amount with the same incremental change in flow rate over another flow rate range and with a plurality of rate of flow indicators being respectively coupled to the output members by a plurality of low torque telemetering means; each indicator including a potentiometer having a relatively slidable wiper arm and resistance unit and being constructed to permit alternate engagement and disengagement of the wiper arm and resistance unit, means for respectively connecting the potentiometer to the telemetering means to provide for relative sliding movement between the wiper arms and resistance units in response to changes in position of the output members, means for connecting the potentiometers to a source of A.-C. excitation to occasion potentiometer output voltages varying with the relative positions of the wiper arms and resistance units, the resistance units being compensated such that the potentiometer output voltages will vary in amplitude linearly and by the same amounts with the same incremental changes in flow rate sensed by the detectors, electrically actuatable means connected to the potentiometers for intermittently and synchronously engaging and disengaging the wiper arms and resistance units, means connecting the potentiometers in additive relationship, a reversible electric motor, a summation output shaft connected to the motor for positioning by the motor to characterize the sum of the flow rate measurements of the detectors, follow-up means actuated by the motor for producing a follow-up output voltage characterizing the angular position of said summation shaft, and means for controlling the operation of the motor including means connected to the follow-up means and potentiometers and responsive to differences between said follow-up voltage and the sum of the potentiometer output voltages.

6. In a flowmeter summation apparatus for use with a plurality of flow detectors each measuring a condition of flow in a different fluid line and each angularly positioning an output member to characterize the sensed flow conditions with the angular positions of the output shafts varying by one angular amount for each incremental change in flow rate over one flow rate range and by another angular amount with the same incremental change in flow rate over another flow rate range and with a plurality of rate of flow indicators being respectively coupled to the output members by a plurality of low torque telemetering means; each indicator including a potentiometer having a wiper arm drivingly connected to the telemetering means and a resistance unit with the potentiometer being constructed to permit alternate engagement and disengagement of the wiper arm and resistance unit, means for connecting the potentiometers to a source of A.-C. excitation to occasion potentiometer output voltages varying with the relative positions of the wiper arms and resistance units, the resistance units being compensated such that the potentiometer output voltages will vary in amplitude linearly and by the same amounts with the same incremental changes in flow rate sensed by the detectors, electrically actuatable means connected to the potentiometers for intermittently and synchronously engaging and disengaging the wiper arms and resistance units at a frequency less than that of the A.-C. excitation of said potentiometers, means connecting the potentiometers in additive relationship, a reversible electric motor, a summation indicator drivingly connected to the motor for positioning by the motor to characterize the sum of the flow rate measurements of the detectors, a follow-up potentiometer having a wiper arm drivingly connected to the motor for producing follow-up on output voltage equal to and of opposite phase relative to the sum of the output voltages of said plurality of potentiometers, a control means for actuating the motor including means connected to the follow-up means and potentiometers and responsive to differences between said follow-up voltages and the sum of the potentiometer output voltages, and switching means operated by said electrically actuatable means and being connected to said control means to render said control means unresponsive to differences between said follow-up and potentiometer output voltages during disengagement of the wiper arm and resistance units of said plurality of potentiometers.

References Cited in the file of this patent

UNITED STATES PATENTS

| | | |
|---|---|---|
| 1,976,266 | Nagel | Oct. 9, 1934 |
| 2,260,913 | Marchment | Oct. 28, 1941 |
| 2,472,609 | Moore | June 7, 1949 |
| 2,714,310 | Jennings | Aug. 2, 1955 |
| 2,724,270 | Trekell | Nov. 22, 1955 |
| 2,730,596 | McLaughlin | Jan. 10, 1956 |
| 2,874,375 | Elwell et al. | Feb. 17, 1959 |

OTHER REFERENCES

Computing Circuits and Devices for Industrial Process Functions (Hornfeck). Transactions of AIEE, vol. 71, part I, July 1952, pages 183–193.